US009723655B2

United States Patent
Wu

(10) Patent No.: US 9,723,655 B2
(45) Date of Patent: Aug. 1, 2017

(54) METHOD AND APPARATUS FOR HANDLING DEVICE TO DEVICE COMMUNICATION IN A WIRELESS COMMUNICATION SYSTEM

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/737,512

(22) Filed: Jun. 12, 2015

(65) Prior Publication Data

US 2015/0365518 A1 Dec. 17, 2015

Related U.S. Application Data

(60) Provisional application No. 62/011,587, filed on Jun. 13, 2014.

(51) Int. Cl.
| | | |
|---|---|---|
| *H04M 1/00* | (2006.01) | |
| *H04W 88/06* | (2009.01) | |
| *H04W 8/00* | (2009.01) | |
| *H04L 29/08* | (2006.01) | |
| *H04M 1/725* | (2006.01) | |
| *H04W 76/02* | (2009.01) | |

(Continued)

(52) U.S. Cl.
CPC ............ *H04W 88/06* (2013.01); *H04L 67/36* (2013.01); *H04M 1/72519* (2013.01); *H04W 8/005* (2013.01); *H04W 48/16* (2013.01); *H04W 76/023* (2013.01); *H04W 48/18* (2013.01)

(58) Field of Classification Search
CPC ........... H02J 5/005; H02J 7/025; H04L 47/14; H04L 67/36
USPC .............................................. 455/552.1, 566
See application file for complete search history.

(56) References Cited

U.S. PATENT DOCUMENTS

| | | | | |
|---|---|---|---|---|
| 2008/0113683 A1* | 5/2008 | Paas | ................. | H04M 1/72519 455/552.1 |
| 2008/0295017 A1* | 11/2008 | Tseng | .................... | G06F 3/0483 715/777 |

(Continued)

FOREIGN PATENT DOCUMENTS

EP  1761096 A1  3/2007

OTHER PUBLICATIONS

3rd Generation Partnership Project, Technical Specification, 3GPP TS 23.303 v12.4.0 (Mar. 2015).

(Continued)

*Primary Examiner* — Edward Urban
*Assistant Examiner* — Max Mathew
(74) *Attorney, Agent, or Firm* — CKC & Partners Co., Ltd.

(57) ABSTRACT

A communication device includes a communication interfacing unit, a display unit, and a processor. The processor operable to perform operations includes controlling the display unit to display a user interface; controlling the display unit to display a first icon on the user interface, in which the first icon indicates a first strength of a first signal of a radio access technology (RAT) received by the communication interfacing unit; and controlling the display unit to display a second icon on the user interface corresponding to a second strength of a second signal of the RAT received by the communication interfacing unit, in which the first signal and the second signal are transmitted by different devices.

16 Claims, 8 Drawing Sheets

(51) Int. Cl.
*H04W 48/16* (2009.01)
*H04W 48/18* (2009.01)

(56) References Cited

U.S. PATENT DOCUMENTS

| | | | |
|---|---|---|---|
| 2010/0279620 A1 | 11/2010 | Paas et al. | |
| 2012/0196578 A1* | 8/2012 | Williams | G06Q 10/02 455/414.1 |
| 2014/0321402 A1* | 10/2014 | Wang | H04W 72/04 370/329 |
| 2015/0146687 A1* | 5/2015 | Kim | H04W 76/023 370/331 |
| 2015/0264595 A1* | 9/2015 | Morita | H04W 8/005 370/252 |
| 2015/0289282 A1* | 10/2015 | Phuyal | H04W 56/00 370/329 |
| 2015/0358888 A1* | 12/2015 | Gulati | H04W 40/02 370/329 |
| 2015/0365994 A1* | 12/2015 | Yu | H04W 76/028 370/336 |
| 2016/0014663 A1* | 1/2016 | Berggren | H04W 36/22 455/436 |
| 2016/0021594 A1* | 1/2016 | Yilmaz | H04W 36/30 370/332 |

OTHER PUBLICATIONS

Ericsson, "Synchronization Signals and Channel Design for D2D Discovery and Communication", 3GPP TSG RAN Meeting #76bis, R1-141380, Shenzhen, China, Mar. 31-Apr. 4, 2014.
Ericsson, "Synchronization Procedures for D2D Discovery and Communication", 3GPP TSG RAN WG1 Meeting #76bis, R1-141381, Shenzhen, China, Mar. 31-Apr. 4, 2014.
CATT, "Resource allocation for D2D synchronization", 3GPP TSG RAN WG1 Meeting #77, R1-142006, Seoul, Korea, May 19-23, 2014.
CATT, "Design of D2DSS and PD2DSCH", 3GPP TSG RAN WG1 Meeting #77, R1-142007, Seoul, Korea, May 19-23, 2014.
3rd Generation Partnership Project, Technical Specification, 3GPP TS 36.300 V12.1.0 (Mar. 2014).
3rd Generation Partnership Project, Technical Specification, 3GPP TR 36.843 V12.0.1 (Mar. 2014).
Corresponding extended European Search Report that these art refrences were cited on Dec. 11, 2015.

* cited by examiner

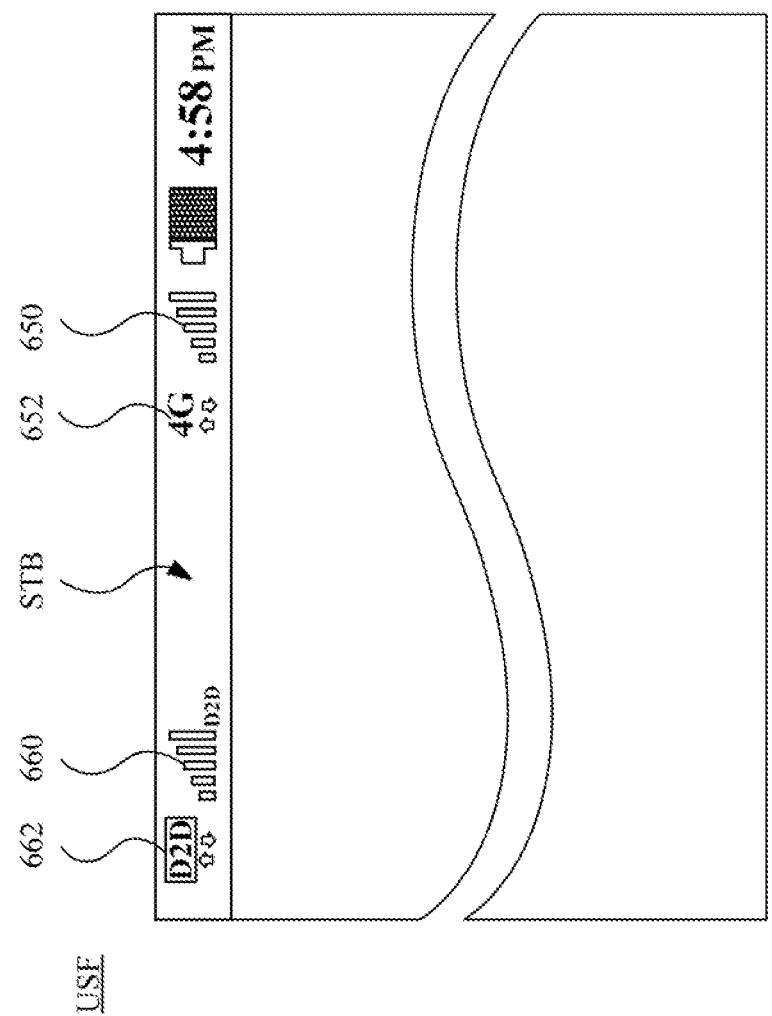

METHOD AND APPARATUS FOR HANDLING DEVICE TO DEVICE COMMUNICATION IN A WIRELESS COMMUNICATION SYSTEM

RELATED APPLICATIONS

This application claims priority to U.S. Provisional Application Ser. No. 62/011,587, filed Jun. 13, 2014, which is herein incorporated by reference.

BACKGROUND

Technical Field

The present disclosure relates to a method and apparatus utilized in wireless communication systems. More particularly, the present disclosure relates to a method and apparatus of handling device to device communication in a wireless communication system.

Description of Related Art

The 3$^{rd}$ Generation Partnership Project (3GPP) has developed a universal mobile telecommunications system (UMTS) which adopts a wideband code division multiple access (WCDMA) as a wireless air interface. In the UMTS, a radio access network known as a universal terrestrial radio access network (UTRAN) includes multiple Node-Bs (NBs) for communicating with multiple user equipments (UEs). The WCDMA provides high frequency spectrum utilization, universal coverage, and high-speed multimedia data transmission which are beneficial for the UEs and the NBs of the UMTS. Furthermore, a long-term evolution (LTE) system supporting the 3GPP Rel-8 standard and/or the 3GPP Rel-9 standard is now being developed by the 3GPP as a successor of the UMTS, to further enhance performance of the UMTS to satisfy user's increasing needs. The LTE system includes a new radio interface and radio network architecture that provides a high data rate, low latency, packet optimization, and improved system capacity and coverage. In the LTE system, a radio access network known as an evolved UTRAN (E-UTRAN) includes multiple envolved NBs (eNBs) for communicating with multiple UEs, and communicates with a core network including a mobility management entity (MME), serving gateway, etc for Non Access Stratum (NAS) control.

An LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint transmission/reception (CoMP), uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

The specification of 3GPP Rel-12 defines that if UEs are in proximity of each other, these devices may be able to use a direct data path to communicate with or discover each other. The UEs which perform this type of communication, i.e., a Proximity-based Service (ProSe) or a device to device (D2D) communication, are said to be in a ProSe communication mode or a UE-to-UE communication mode.

SUMMARY

One aspect of the present disclosure is related to a communication device. In accordance with one embodiment of the present disclosure, the communication device includes a communication interfacing unit, a display unit, and a processor. The processor operable to perform operations includes controlling the display unit to display a user interface; controlling the display unit to display a first icon on the user interface, in which the first icon indicates a first strength of a first signal of a radio access technology (RAT) received by the communication interfacing unit; and controlling the display unit to display a second icon on the user interface corresponding to a second strength of a second signal of the RAT received by the communication interfacing unit, in which the first signal and the second signal are transmitted by different devices.

Another aspect of the present disclosure is related to a communication device. In accordance with one embodiment of the present disclosure, the communication device includes a communication interfacing unit, a display unit, and a processor. The processor operable to perform operations includes controlling the display unit to display a user interface; controlling the display unit to display a first icon on the user interface, in which the first icon indicates a packet data network (PDN) connection with a network is activated; controlling the display unit to display a second icon on the user interface corresponding to whether a first D2D communication is activated to allow the communication device to receive and transmit a first D2D signal with a first communication device via the communication interfacing unit.

Another aspect of the present disclosure is related to a communication device. In accordance with one embodiment of the present disclosure, the communication device includes a communication interfacing unit, a display unit, and a processor. The processor operable to perform operations includes controlling the display unit to display a user interface, in which a plurality of items corresponding to contacts are presented on the user interface; and in response to an activation corresponding to a selected item of the items, activating a D2D communication with a device of a selected contact of the contacts corresponding to the selected item or controlling the display unit to display an option to activate a first D2D communication with the device of the selected contact. The first D2D communication with the device of the selected contact is activated to allow the communication device to receive and transmit a first D2D signal with the device of the selected contact.

Through an application of one embodiment described above, it convenience for a user to use the D2D communication.

BRIEF DESCRIPTION OF THE DRAWINGS

The invention can be more fully understood by reading the following detailed description of the embodiment, with reference made to the accompanying drawings as follows:

FIG. 5 illustrates a user interface of a communication device according to one embodiment of the present disclosure.

DETAILED DESCRIPTION

Figure 1:
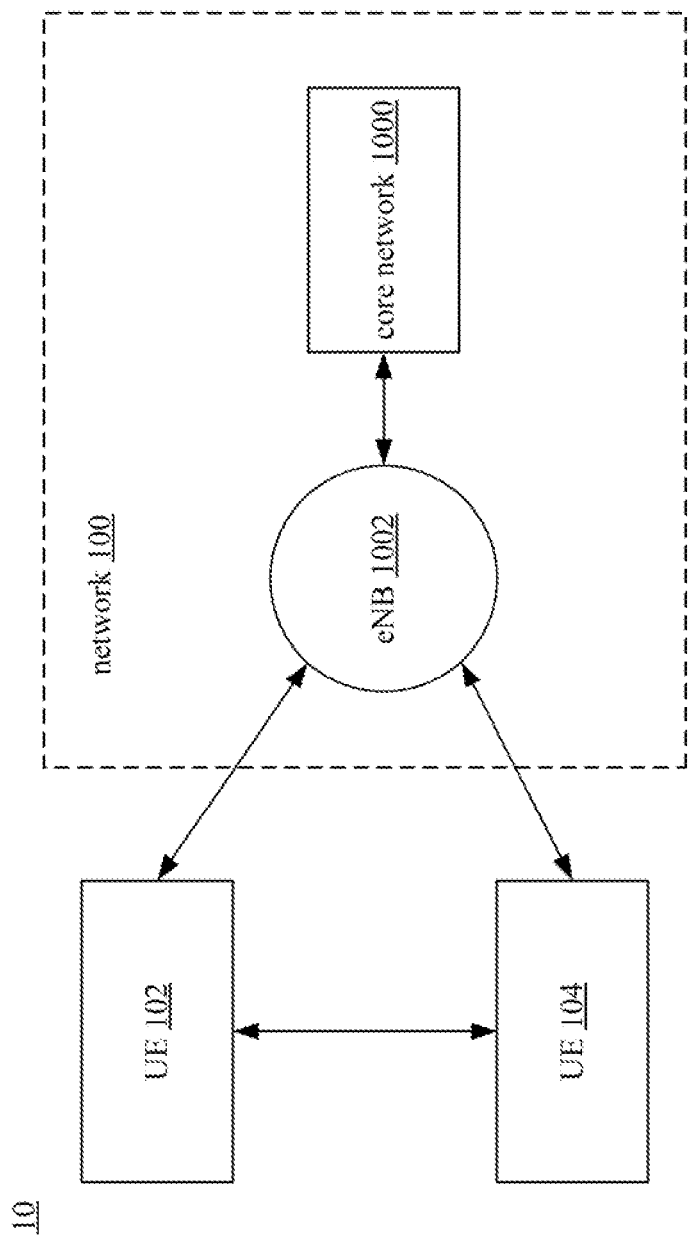
FIG. 1 is a schematic diagram of a wireless communication system according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

Any element in a claim that does not explicitly state "means for" performing a specified function, or "step for" performing a specific function, is not to be interpreted as a "means" or "step" clause as specified in 35 U.S.C. §112(f). In particular, the use of "step of" in the claims herein is not intended to invoke the provisions of 35 U.S.C. §112(f).

Reference is made to FIG. 1, which is a schematic diagram of a wireless communication system 10 according to one embodiment of the present disclosure. The wireless communication system 10 includes a network 100 and user equipments (UEs) 102 and 104. In FIG. 1, the network 100 and the UEs 102 and 104 are simply used for illustrating the structure of the wireless communication system 10, and the present disclosure is not limited to such an embodiment. In one embodiment, the network 100 can be a universal terrestrial radio access network (UTRAN) includes a plurality of node-Bs (NBs) in a universal mobile telecommunications system (UMTS). In another embodiment, the network 100 can be an evolved UTRAN (E-UTRAN) including a plurality of evolved NBs (eNBs) (one of which may be the eNB 1002 illustrated in FIG. 1), in which the E-UTRAN may relay in a long term evolution (LTE) system or an LTE-Advanced (LTE-A) system. It should be noted that, although an eNB 1002 is illustrated in FIG. 1, but the eNB 1002 can be replaced by a NB on a basis of actual requirements, and the present disclosure is not limited to such an embodiment.

In one embodiment, the network 100 may include both the UTRAN/E-UTRAN including a plurality of NBs/eNBs and a core network (e.g., the core network 1000), in which the core network includes network entities such as Mobility Management Entity (MME), Serving Gateway (S-GW), Packet Data Network (PDN), Gateway (P-GW, Self-Organizing Networks (SON) server and/or Radio Network Controller (RNC), etc. In other words, after the network 100 receives information transmitted from a UE, the information may be processed only by the UTRAN/E-UTRAN, and decisions corresponding to the information are made at the UTRAN/E-UTRAN. In one embodiment, the UTRAN/E-UTRAN may forward the information to the core network, and the decisions corresponding to the information are made at the core network after the core network processes the information. In one embodiment, the information can be processed by both the UTRAN/E-UTRAN and the core network, and the decisions are made after coordination and/or cooperation are performed by the UTRAN/E-UTRAN and the core network.

In one embodiment, the UEs (e.g., the UEs 102, 104) can be portable communication devices for performing speech and data communication through a network such as the UMTS, the LTE system or the LTE-A system, but is not limited in this regard. In one embodiment, the network 100 and one of the UEs can be seen as a transmitter or a receiver according to transmission direction. For example, for an uplink (UL), the communication device is the transmitter and the network 100 is the receiver. For a downlink (DL), the network 100 is the transmitter and the communication device is the receiver.

In the embodiment in FIG. 1, the UEs 102 and 104 connect with the same eNB 1002 in the network 100. However, in another wireless communication system 20 according to one embodiment shown in FIG. 2, the UEs 202 and 204 may connect with different eNBs 2002 and 2004 respectively in the network 200, in which the eNBs 2002 and 2004 are connected to the core network 2000. Thus, the present disclosure is not limited to the embodiment shown in FIG. 1.

Figure 2:
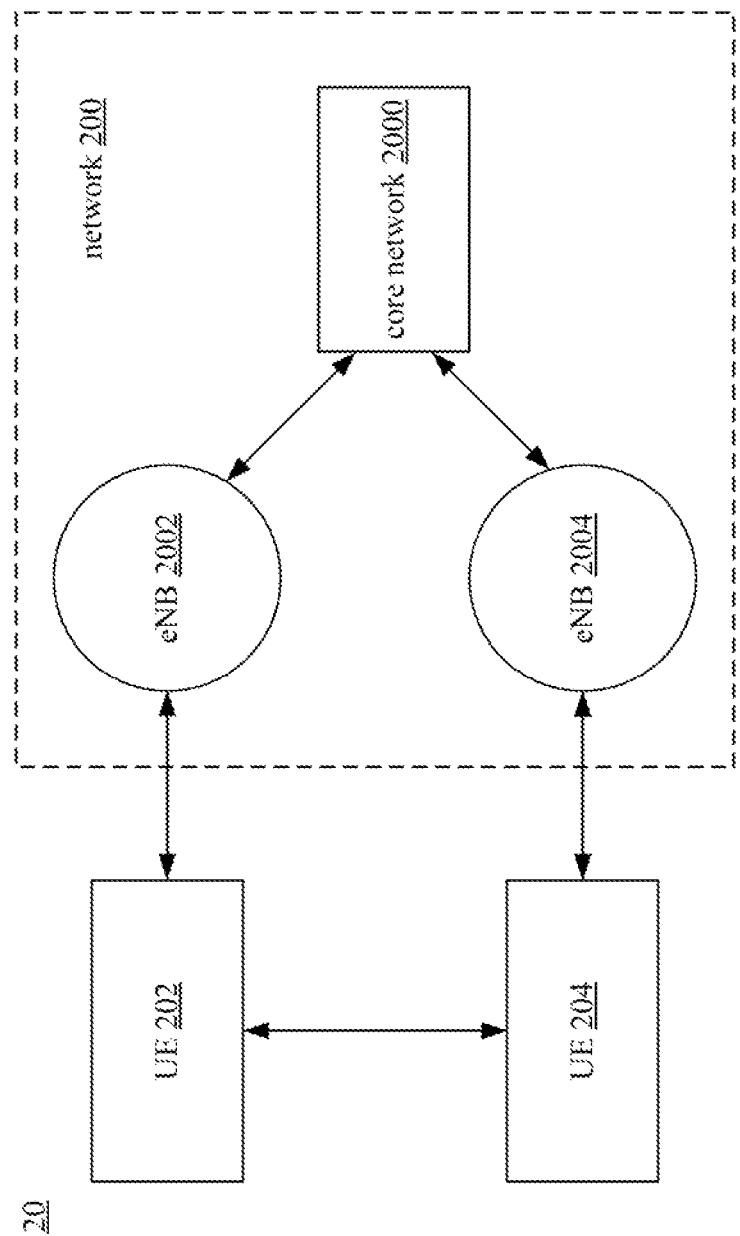
FIG. 2 is a schematic diagram of a wireless communication system according to another embodiment of the present disclosure.
Figure 3:
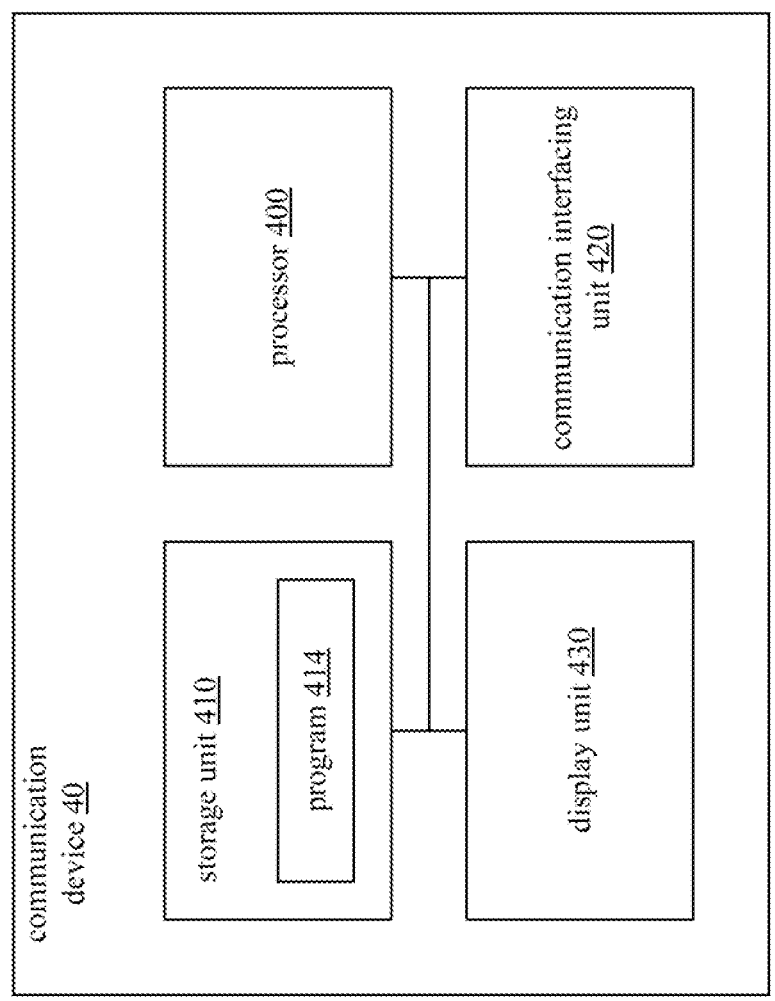
FIG. 3 is a schematic diagram of a communication device according to one embodiment of the present disclosure.

Reference is now made to FIG. 3, which a schematic diagram of a communication device 40 according to one embodiment of the present disclosure. In some embodiments, the communication device 40 may be one of the UEs 102, 104, 202, 204 shown in FIG. 1 and FIG. 2, but is not limited in this regard. In one embodiment, the communication device 40 may include a processor 400, a storage unit 410, a communication interfacing unit 420, and a display unit 430. In one embodiment, the processor 400 may be a microprocessor or an Application Specific Integrated Circuit (ASIC), but is not limited in this regard. In one embodiment, the storage unit 410 may be any data storage device that can store a program code (e.g., the program 414) which can be accessed and executed by the processor 400. In one embodiment, the storage unit 410 may be, for example, a read-only memory (ROM), a magnetic tape, a hard disk, and an optical data storage device, but is not limited in this regard. In one embodiment, the communication interfacing unit 420 may be a transceiver and is used to transmit and receive signals (e.g., messages or packets). In some embodiments, the communication interfacing unit 420 may transmit signals according to processing results of the processor 400. In one embodiment, the display unit may be realized by, for example, a liquid crystal display (LCD), an e-paper display, a touch control display, or another suitable display device.

Figure 4:
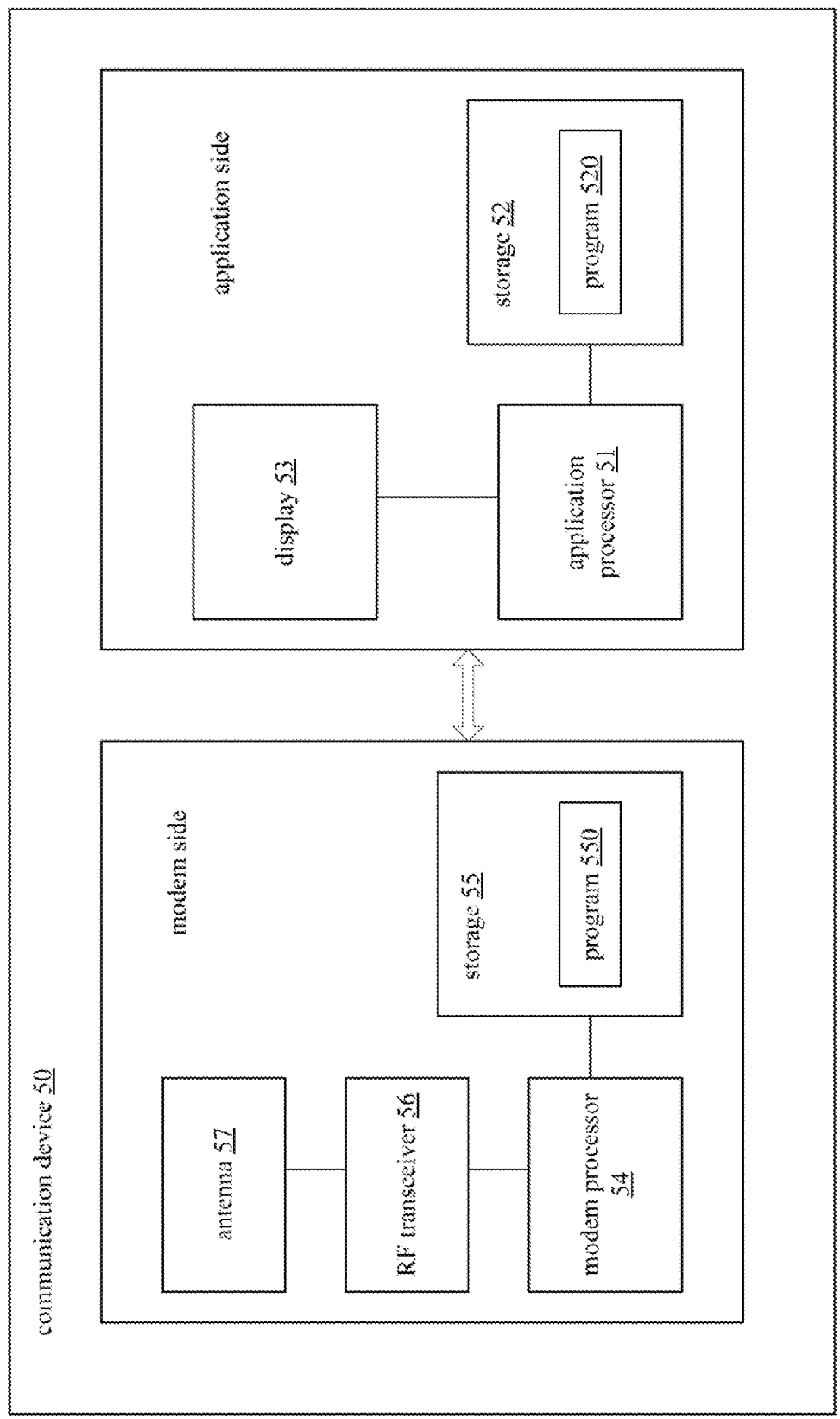
FIG. 4 is a schematic diagram of a communication device according to another embodiment of the present disclosure.
Figure 5A:
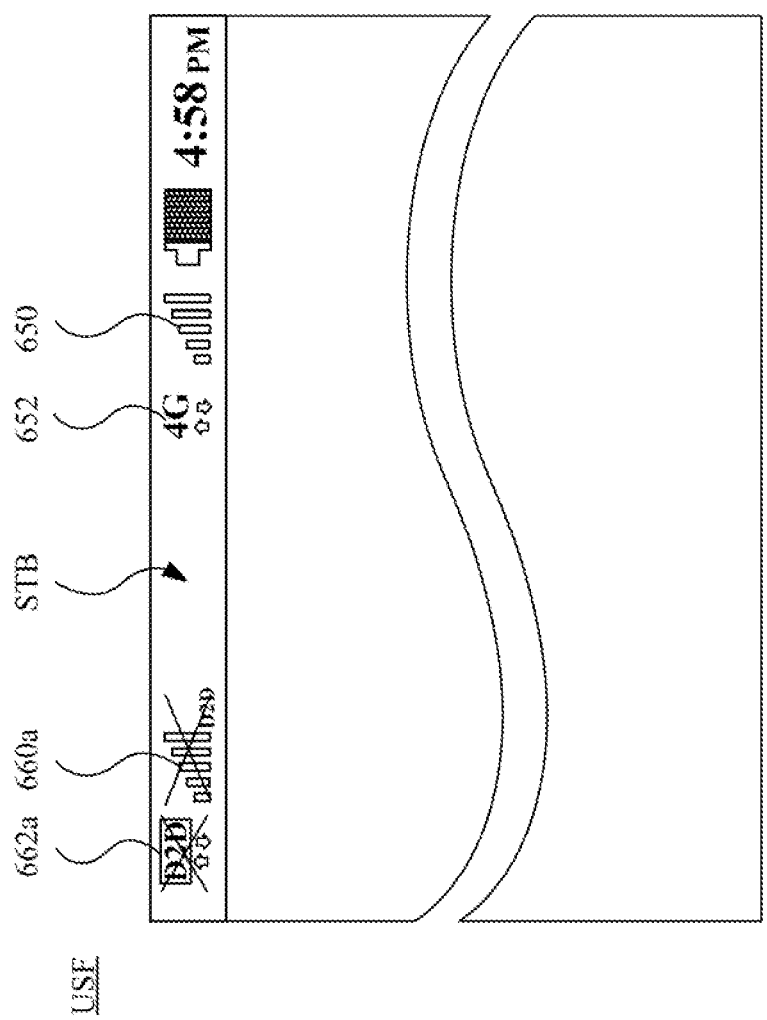
FIG. 5a illustrates a user interface of a communication device according to another embodiment of the present disclosure.

Reference is now made to FIG. 4, which a schematic diagram of a communication device 50 according to one embodiment of the present disclosure. In some embodiments, the communication device 50 may be one of the UEs 102, 104, 202, 204 shown in FIG. 1 and FIG. 2, but is not limited in this regard. In one embodiment, the communication device 50 may include an application side APS and a modem side MDS. The application side APS may include an application processor 51, an application storage 52, and a display 53. The modem side MDS may include a modem processor 54, a modem storage 55, a radio-frequency (RF) transceiver 56, and an antenna 57. In one embodiment, the application processor 51 may be an Advanced RISC Machine (ARM) based processor, a Microprocessor without Interlocked Pipeline Stages (MIPS) based processor, or an x86 based processor, but is not limited in this regard. In one embodiment, the application processor 51 may run an operating system (OS) (e.g., an Android system, a Windows phone 7 system, or an iPhone OS (iOS)) to control the display 53 to display software applications and user interface (UI) (e.g., the user interface USF shown in FIGS. 5, 5a, 6, 6a), or to perform IP Multimedia Subsystem (IMS) operation based on Real-time Transport Protocol (RTP), Session Initiation Protocol (SIP), User Datagram Protocol (UDP), and Internet Protocol (IP) stacks. In one embodiment, the modem processor 54 may be an ARM based processor. The modem processor 54 may be able to run communication protocol software including 3GPP/3GPP2 protocol stacks to support LTE/HSPA/UMT/GSM/CDMA2000 wireless communication technologies. In one embodiment, the modem processor 54 may also perform IMS operation based on RTP, SIP, UDP, and IP protocol stacks according to practical requirement.

In one embodiment, the application storage 52 and the modem storage 55 may be any data storage device that stores data including programs 520 and 550, which are read and processed by the application processor 51 and the modem processor 54, respectively. In one embodiment, one of the application storage 52 and the modem storage 55 may be realized by using, for example, a subscriber identity module (SIM), a ROM, a RAM, a CD-ROM, a magnetic tape, a hard disk, an optical data storage device, and a cloud storage, but is not limited in this regard. In one embodiment, the application storage 52 and the modem storage 55 may share a same data storage device, e.g. the same data storage device may have two partitions, in which the application storage 52 may be one partition, and the modem storage 55 may be the other partition. In one embodiment, the RF transceiver 56 may be used for wirelessly communicating with other communication devices and can transform process results from the modem processor 54 into radio signals. In one embodiment, the display 53 may be realized by, for example, an LCD, an e-paper display, a touch control display, or another suitable display device.

In the paragraphs below, a process 60 executed by the communication device 102 or 104 in FIG. 1 or the communication device 202 or 204 in FIG. 2 for handling a D2D communication will be described with reference to FIG. 5. The process 60 may be compiled into the program 414 or the program 520 and/or program 550. The processor 400 or the modem processor 54 and/or the application processor 51 may execute the program 414 or the program 520 and/or program 550 to perform operations in the process 60.

In one embodiment, the process 60 may be applied to a communication device having a structure that is the same as or similar to the structure of the communication device 40 shown in FIG. 3 or the communication device 50 shown in FIG. 4. To simplify the description below, in the following paragraphs, the embodiment shown in FIG. 3 will be used as an example to describe the process 60 according to an embodiment of the present disclosure. However, the present disclosure is not limited to application to the embodiment shown in FIG. 3.

In addition, it should be noted that in the steps of the following process 60, no particular sequence is required unless otherwise specified. Moreover, the following steps also may be performed simultaneously or the execution times thereof may at least partially overlap.

Furthermore, the steps of the process 60 may be added to, replaced, and/or eliminated as appropriate, in accordance with various embodiments of the present disclosure.

In one embodiment, the process 60 includes the steps outlined below.

Step 600: Start.

Step 602: The processor 400 controls the display unit 430 to display a user interface USF. In one embodiment, the user interface USF includes a status bar STB.

Step 604: The processor 400 receives a first signal of a radio access technology (RAT) by the communication interfacing unit 420. In one embodiment, the first signal is transmitted by an eNB of LTE (e.g., the eNB 1002, 2002 or 2004).

Step 606: The processor 400 receives a second signal of the RAT by the communication interfacing unit 420. In one embodiment, the second signal is a D2D signal of LTE transmitted by a UE (e.g., the UE 102, 104, 202, or 204).

Step 608: The processor 400 controls the display unit 430 to display a first icon 650 on the user interface USF, in which the first icon 650 indicates a first strength of the first signal. In one embodiment, the first icon 650 is displayed on the status bar STB.

Step 610: The processor 400 controls the display unit 430 to display a second icon 660 on the user interface USF corresponding to a second strength of the second signal of the RAT. In one embodiment, the second icon 660 indicates the second strength of the second signal. In one embodiment, the second icon 660 is displayed on the status bar STB.

Step 612: End.

In the process 60, the communication device 40 (e.g., the communication device 102 or 202) camping on an eNB (e.g., the eNB 1002 or 2002) may perform a D2D communication with another communication device (e.g., the communication device 104 or 204). In one embodiment, the first signal may be, for example, a Cell-specific Reference Signal (CRS) or a Channel State Information Reference Signal (CSI-RS) of LTE. In one embodiment, the second signal may be, for example, a D2D Synchronization Signal (D2DSS) or a Physical D2D Synchronization Channel (PD2DSCH) of LTE. In some embodiments, the second signal may also be received D2D data (e.g., for a D2D direction communication or a D2D discovery operation) or D2D control information.

In one embodiment, the processor 400 of the communication device 40 may determine the strength of the first signal as a first quantitative value (e.g., number of bars, a Reference Signal Received Power (RSRP) value, a Reference Signal Received Quality (RSRQ) value, or a value with a range) and determine the strength of the second signal as a second quantitative value (e.g., number of bars, a RSRP value, a RSRQ value, or a value with a range). In one embodiment, the processor 400 may control the display unit 430 to display the first quantitative value as the first icon 650 and to display the second quantitative value as the second icon 660.

In one embodiment, under a condition that the second signal of the RAT is not received for a predetermined time threshold (e.g., 2 or 3 minutes), the processor 400 may control the display unit 430 to display a third icon 660a (see FIG. 5a) indicating there is no service of the D2D communication relevant to the second signal.

With such operations, a user of the communication device 40 (e.g., the communication device 102 or 202) can not only know the signal strength status for communication with the eNB (e.g., the eNB 1002 or 2002) but can also know the signal strength for the D2D communication with another communication device (e.g., the communication device 104 or 204). Thus, the user can realize what happens when the signal strength status for the communication with the eNB (e.g., the eNB 1002 or 2002) is good and the signal strength status for the D2D communication with another communication device (e.g., the communication device 104 or 204) is poor due to a long distance therebetween.

It is noted that, in one embodiment, when the process 60 applies to the communication device 50 shown in FIG. 4, the modem side may provide the first quantitative value and the second quantitative value to the application side. The application side may directly display the first quantitative value and the second quantitative value by using the display 53. In another embodiment, the application side may convert the first quantitative value to a third quantitative value and convert the second quantitative value to a fourth quantitative value, and subsequently display the third quantitative value and the fourth quantitative value by using the display 53.

Furthermore, it is noted that the communication device 40 (e.g., the communication device 102 or 202) may be in D2D communications with a plurality of communication devices. For example, in addition to the first communication device 104 or 204, the communication device 102 or 202 may be in a D2D communication with a second communication device. In such a case, the processor 400 may control the display unit 430 to display a third signal strength of a third signal of the RAT transmitted by the second communication device via the user interface corresponding 420. As another example, the processor 400 may control the display unit 430 to display a signal strength according to any signal received from the plurality of the communication devices.

Moreover, in some embodiment, the processor 400 may control the display unit 430 to display the second icon 660 corresponding to the second strength of the second signal and the third strength of the third signal.

In the paragraphs below, a process 70 executed by the communication device 102 or 104 in FIG. 1 or the communication device 202 or 204 in FIG. 2 for handling a D2D communication will be described with reference to FIG. 5. The process 70 may be compiled into the program 414 or the program 520 and/or program 550. The processor 400 or the modem processor 54 and/or the application processor 51 may execute the program 414 or the program 520 and/or program 550 to perform operations in the process 70.

In one embodiment, the process 70 may be applied to a communication device having a structure that is the same as or similar to the structure of the communication device 40 shown in FIG. 3 or the communication device 50 shown in FIG. 4. To simplify the description below, in the following paragraphs, the embodiment shown in FIG. 3 will be used as an example to describe the process 70 according to an embodiment of the present disclosure. However, the present disclosure is not limited to application to the embodiment shown in FIG. 3.

In addition, it should be noted that in the steps of the following process 70, no particular sequence is required unless otherwise specified. Moreover, the following steps also may be performed simultaneously or the execution times thereof may at least partially overlap.

Furthermore, the steps of the process 70 may be added to, replaced, and/or eliminated as appropriate, in accordance with various embodiments of the present disclosure.

In one embodiment, the process 70 includes the steps outlined below.

Step 700: Start.

Step 702: The processor 400 controls the display unit 430 to display a user interface USF. In one embodiment, the user interface USF includes a status bar STB.

Step 704: The processor 400 activates a Packet Data Network (PDN) connection with a network (e.g., the network 100 or 200). In one embodiment, the Packet Data Network connection is an LTE connection. In one embodiment, the PDN connection is activated to allow the communication device 40 to transmit data to the network 100 via an eNB (e.g., the eNB 1002, 2002, or 2004) of LTE.

Step 706: The processor 400 activates a D2D communication. In one embodiment, the D2D communication is activated to allow the communication device 40 to receive and/or transmit a D2D signal with another communication device via the communication interfacing unit 420.

Step 708: The processor 400 controls the display unit 430 to display a first icon 652 on the user interface USF, in which the first icon 652 indicates the PDN connection with the network (e.g., the network 100 or 200) is activated. In one embodiment, the first icon 652 is displayed on the status bar STB.

Step 710: The processor 400 controls the display unit 430 to display a second icon 662 on the user interface USF corresponding to whether the D2D communication with the another communication device is activated. In one embodiment, the second icon 662 is displayed on the status bar STB.

In the process 70, the communication device 40 (e.g., the communication device 102 or 202) camping on an eNB (e.g., the eNB 1002 or 2002) may activate the PDN connection to transmit/receive data to/from the eNB and activate the D2D communication with another communication device (e.g., the communication device 104 or 204). The communication device 40 displays the first icon 652 showing the data communication with the network (e.g., the network 100 or 200) is activated and the second icon showing the D2D communication is activated on the display unit 430. With such operations, a user of the communication device 40 can know the data communication status of the communication with the network and the data communication status of the D2D communication with the another communication device.

In one embodiment, under a condition that the D2D signal from the another communication device is not received for a predetermined time threshold (e.g., 2 or 3 minutes), the processor 400 may control the display unit 430 to display a third icon 662a (see FIG. 5a) indicating there is no service relevant to the D2D communication with the another communication device.

It is noted that, in one embodiment, when the process 70 applies to the communication device 50 shown in FIG. 4, the modem side may provide a first indication to application side to indicate the PDN connection is activated successfully. The application side displays the first icon 652 according to the first indication by the display 53. Similarly, the modem side may provide a second indication to the application side to indicate the D2D communication is activated successfully. The application side displays the second icon 662 according to the second indication.

Furthermore, it is noted that the communication device 40 (e.g., the communication device 102 or 202) may be in D2D communications with a plurality of communication devices. For example, in addition to a first communication device 104 or 204, the communication device 102 or 202 may be in a second D2D communication with a second communication device. In such a case, the processor 400 may control the display unit 430 to display a third icon on the user interface USF corresponding to whether the second D2D communication with the second communication device is activated to allow the communication device 40 to receive and/or transmit a second D2D signal with the second communication device via the communication interfacing unit 420. In another embodiment, the processor 400 may control the display unit 430 to display the second icon 662 on the user interface USF corresponding to activations of the first D2D communication with the first communication device and the second D2D communication with the second communication device.

In one embodiment, the communication device 40 may display the D2D communication activation status for each of a plurality of communication device in D2D communications with the communication devices. In another embodiment, the communication device 40 may display a D2D communication activation status for all of the plurality of the communication devices. In still another embodiment, the communication device may display a first D2D communication activation status for a first plurality of communication devices which belongs to a first group and display a second D2D communication activation status for a second plurality of communication devices which belongs to a second group.

It should be noted that, in some embodiment, the processes 60, 70 can be integrated. That is, the icons 650, 652, 660, 662 can be displayed in the same time, but the present disclosure is not limited in this regard. Additionally, one of the icons 660, 660*a* and one of the icons 662, 662*a* can be displayed in the same time, but the present disclosure is not limited in this regard.

Figure 6:
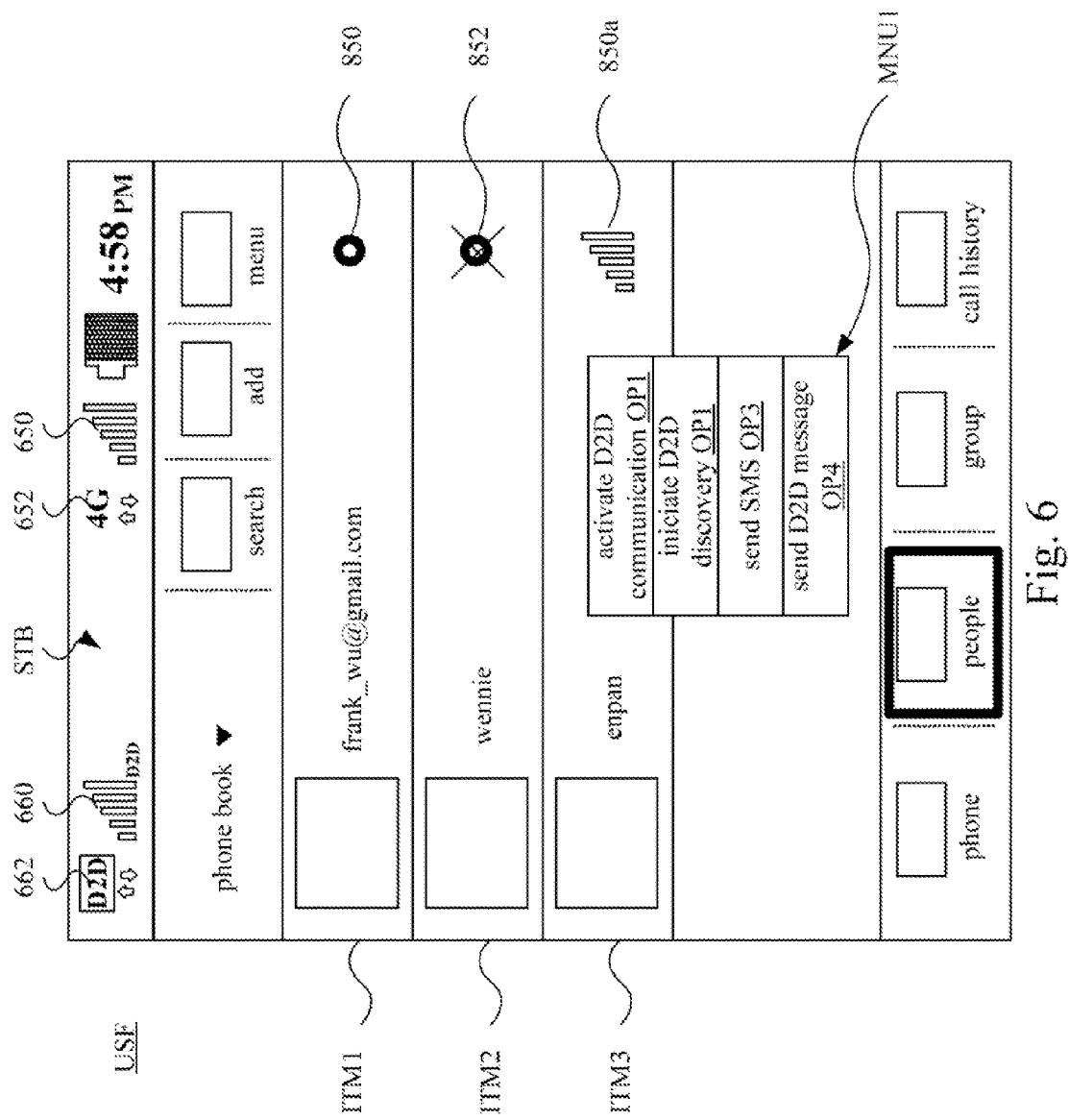
FIG. 6 illustrates a user interface of a communication device according to one embodiment of the present disclosure.
Figure 6A:
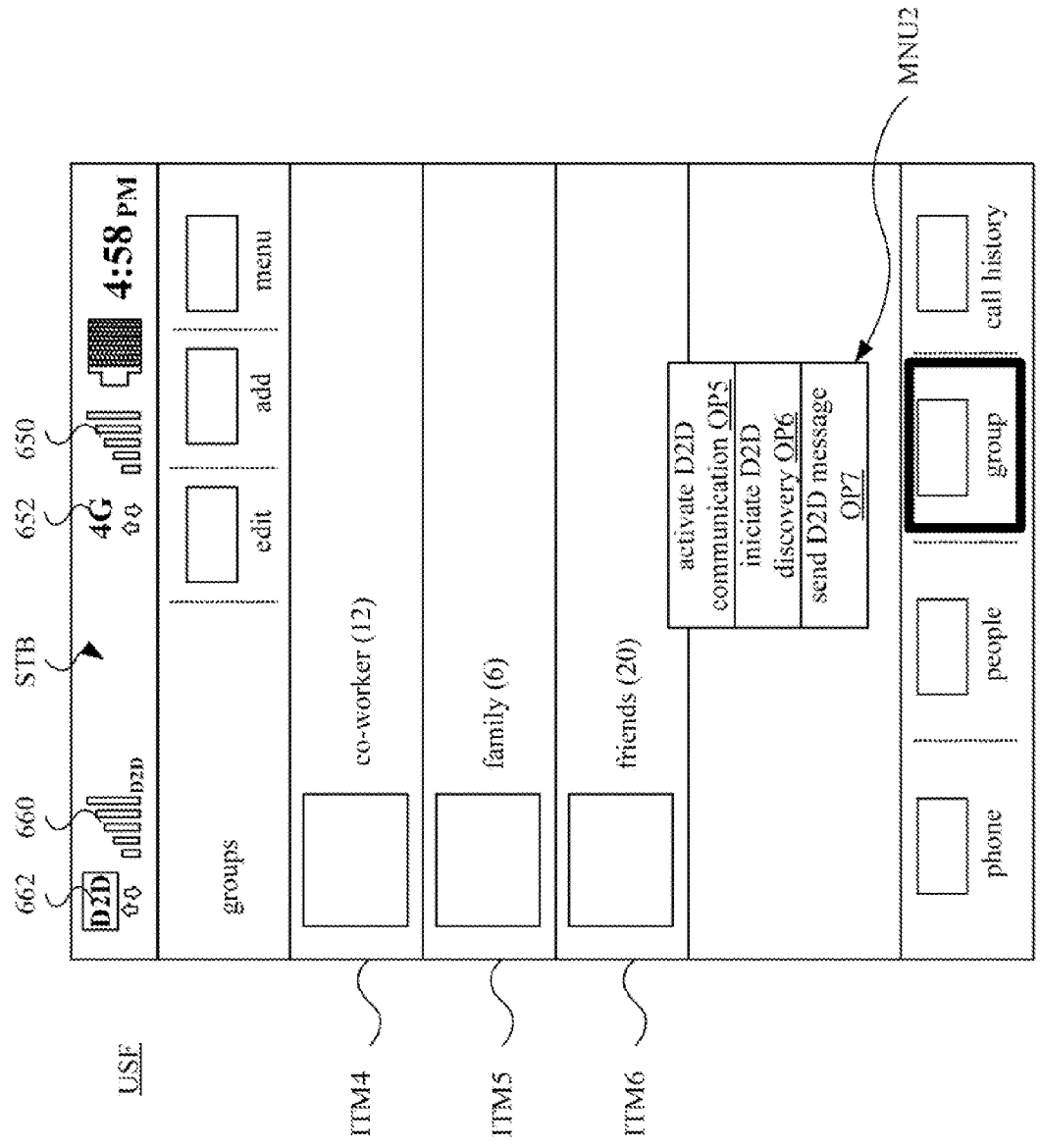
FIG. 6a illustrates a user interface of a communication device according to another embodiment of the present disclosure.

In the paragraphs below, a process 80 executed by the communication device 102 or 104 in FIG. 1 or the communication device 202 or 204 in FIG. 2 for handling a D2D communication will be described with reference to FIG. 6. The process 80 may be compiled into the program 414 or the program 520 and/or program 550. The processor 400 or the modem processor 54 and/or the application processor 51 may execute the program 414 or the program 520 and/or program 550 to perform operations in the process 80.

In one embodiment, the process 80 may be applied to a communication device having a structure that is the same as or similar to the structure of the communication device 40 shown in FIG. 3 or the communication device 50 shown in FIG. 4. To simplify the description below, in the following paragraphs, the embodiment shown in FIG. 3 will be used as an example to describe the process 80 according to an embodiment of the present disclosure. However, the present disclosure is not limited to application to the embodiment shown in FIG. 3.

In addition, it should be noted that in the steps of the following process 80, no particular sequence is required unless otherwise specified. Moreover, the following steps also may be performed simultaneously or the execution times thereof may at least partially overlap.

Furthermore, the steps of the process 80 may be added to, replaced, and/or eliminated as appropriate, in accordance with various embodiments of the present disclosure.

In one embodiment, the process 80 includes the steps outlined below.

Step 800: Start.

Step 802: The storage unit 410 stores a list including a plurality of contacts' records. Each of the contacts' records includes a name and at least one of phone number, email address, Uniform Resource Locator (URL), and Uniform Resource Identifier (URI).

Step 804: The processor 400 controls the display unit 430 to display a user interface USF, in which items ITM1, ITM2, ITM3 corresponding to the contacts are presented on the user interface USF.

Step 806: In one embodiment, when one of the items ITM1, ITM2, ITM3 is activated (e.g., touched or selected), the processor 400 activates a D2D communication with a device of a selected contact of the contacts corresponding to the selected item according to the data stored in the storage unit 410. In another embodiment, when one of the items ITM1, ITM2, ITM3 is activated (e.g., touched or selected), the processor 400 controls the display unit 430 to display a menu MNU1 including options OP1, OP2, OP3, OP4. The option OP1 is for activating a D2D communication with the device of the selected contact, in which the D2D communication with the device of the selected contact is activated to allow the communication device to receive and/or transmit a D2D signal with the device of the selected contact. The option OP2 is for initiating a D2D discovery operation to check whether the device of the selected contact is reachable. Under a condition that the device of the selected contact is reachable, a D2D signal transmitted by the communication device 40 is able to be received by the device of the selected contact. The option OP3 is for sending a SMS message to the device of the selected contact. The option OP4 is for sending a D2D message to the device of the selected contact.

Step 808: End.

In one embodiment, in the D2D discovery operation, the communication device 40 may announce certain information (e.g. ProSe Application Code) that could be used by the device of the selected contact. Then the device of the selected contact may utilize the certain information to get detailed information. The device of the selected contact may or may not acknowledge that the communication device 40 is in proximity and return a response. In another embodiment, in the D2D discovery operation, the communication device 40 may transmit a request containing certain information about the device of the selected contact to discover, so that the device of the selected contact is able to acknowledge that the communication device 40 in proximity is searching the device of the selected contact and return a response.

With the operations described above, a user of the communication device 40 can easily operate the communication device 40 to perform a D2D communication. The items ITM1, ITM2, ITM3 can be selected by toughing the items on the display unit 430 when the user wants to activate a D2D communication to the devices corresponding to the items.

In one embodiment, under a condition that the communication device 40 fails to reach the device of the selected contact in the D2D communication (e.g., due to no response received from the device of the selected contact for a predetermined time threshold or after transmitting D2D signals, data or discovery messages several times), the communication device 40 may display that the D2D communication with the device of the selected contact fails on the display unit 430. In one embodiment, the communication device 40 may display an icon 852 visually corresponding to the selected item to indicate that the D2D communication with the device of the selected contact fails.

In one embodiment, the processor 400 may control the display unit 430 to display a plurality of group items ITM4, ITM5, ITM6 (see FIG. 6a) respectively corresponding to a plurality of groups of the contacts on the user interface USF. Subsequently, in response to an activation corresponding to a selected group item of the group items ITM4, ITM5, ITM6, the processor 400 may activate D2D communications with devices of the contacts belongs to a selected group of the groups corresponding to the selected group item or control the display unit 430 to display a menu MNU2 including options OP5, OP6, OP7. The OP5 is for activating D2D communications with the devices of the contacts belongs to the selected group, in which the D2D communications with the devices of the contacts belongs to the selected group are activated to allow the communication device 40 to receive and/or transmit D2D signals with the devices of the contacts belongs to the selected group. In one embodiment, the OP6 is for initiating a D2D discovery operation to announce certain information for the devices of the contacts belongs to the selected group. In another embodiment, the OP6 is for initiating a D2D discovery operation to check whether the devices of the contacts belongs to the selected group are reachable. Under a condition that the devices of the contacts belongs to the selected group are reachable, D2D signals transmitted by the communication device 40 is able to be received by the devices of the contacts belongs to the selected group. The OP7 is for transmitting a D2D message to the devices of the contacts belongs to the selected group.

With the operations described above, a user of the communication device 40 can easily operate the communication device 40 to perform a D2D communication with contacts belongs to different groups.

In the paragraphs below, a process 90 executed by the communication device 102 or 104 in FIG. 1 or the communication device 202 or 204 in FIG. 2 for handling a D2D communication will be described with reference to FIG. 6. The process 90 may be compiled into the program 414 or the program 520 and/or program 550. The processor 400 or the modem processor 54 and/or the application processor 51 may execute the program 414 or the program 520 and/or program 550 to perform operations in the process 90.

In one embodiment, the process 90 may be applied to a communication device having a structure that is the same as or similar to the structure of the communication device 40 shown in FIG. 3 or the communication device 50 shown in FIG. 4. To simplify the description below, in the following paragraphs, the embodiment shown in FIG. 3 will be used as an example to describe the process 90 according to an embodiment of the present disclosure. However, the present disclosure is not limited to application to the embodiment shown in FIG. 3.

In addition, it should be noted that in the steps of the following process 90, no particular sequence is required unless otherwise specified. Moreover, the following steps also may be performed simultaneously or the execution times thereof may at least partially overlap.

Furthermore, the steps of the process 90 may be added to, replaced, and/or eliminated as appropriate, in accordance with various embodiments of the present disclosure.

In one embodiment, the process 90 includes the steps outlined below.

Step 900: Start.

Step 902: The storage unit 410 stores a list including a plurality of contacts' records. Each of the contacts' records includes a name and at least one of phone number, email address, URL, and URI.

Step 904: The processor 400 controls the display unit 430 to display a user interface USF, in which items ITM1, ITM2, ITM3 corresponding to the contacts are presented on the user interface USF. In one embodiment, statuses of the items ITM1, ITM2, ITM3 may be presented on the user interface USF visually corresponding to the items respectively. In one embodiment, the processor 400 may control the display unit 430 to display an icon 850 visually corresponding to one of the items, in which the icon 850 indicates that a D2D communication with a device of one of the contacts corresponding to the one of the items is activated. In another embodiment, the processor 400 may control the display unit 430 to display an icon 850a visually corresponding to one of the items, in which the icon 850a a signal strength of a signal relevant to a D2D communication with a device of one of the contacts corresponding to the one of the items.

Step 906: End.

In one embodiment, one of the D2D statuses may indicate that another communication device of one of the contacts is in proximity of the communication device 40 or the communication device 40 is in a D2D communication with a communication device of one of the contacts.

It should be noted that, in one embodiment, the processes 80, 90 can be integrated. That is, the icon 850, 852, or 850a may be presented visually corresponding to one of the items ITM1-ITM3 activated to activate a D2D communication or display the menu MNU1, but the present disclosure is not limited in this regard.

Moreover, in one embodiment, the processes 60, 70, 80, 90 can be integrated. That is, the icons 662, 660, the items ITM1-ITM3, and the icon 850, 852, or 850a may be presented on the user interface in a same time, but the present disclosure is not limited in this regard, In the paragraphs below, a process 110 executed by the communication device 102 or 104 in FIG. 1 or the communication device 202 or 204 in FIG. 2 for handling a D2D communication will be described. The process 110 may be compiled into the program 414 or the program 520 and/or program 550. The processor 400 or the modem processor 54 and/or the application processor 51 may execute the program 414 or the program 520 and/or program 550 to perform operations in the process 110.

In one embodiment, the process 110 may be applied to a communication device having a structure that is the same as or similar to the structure of the communication device 40 shown in FIG. 3 or the communication device 50 shown in FIG. 4. To simplify the description below, in the following paragraphs, the embodiment shown in FIG. 3 will be used as an example to describe the process 80 according to an embodiment of the present disclosure. However, the present disclosure is not limited to application to the embodiment shown in FIG. 3.

In addition, it should be noted that in the steps of the following process 110, no particular sequence is required unless otherwise specified. Moreover, the following steps also may be performed simultaneously or the execution times thereof may at least partially overlap.

Furthermore, the steps of the process 110 may be added to, replaced, and/or eliminated as appropriate, in accordance with various embodiments of the present disclosure.

In one embodiment, the process 110 includes the steps outlined below.

Step 1100: Start.

Step 1102: The processor 400 enables or disables a D2D communication according to a setting.

Step 1104: End

In the process 110, the communication device 40 (e.g., the communication device 102 or 202) enables or disables the D2D communication according to a setting. When the D2D communication is disabled, the communication device 40 ignores a D2D resource configuration transmitted by an eNB (e.g., the eNB 1002 or 2002). The setting may be set by a user via a user interface or configured by a network transmitting a message indicating enabling or disabling the D2D communication. The user can disable the D2D communication if the user does not want to use the D2D communication. For example, the user may not want to be discovered that he/she is in proximity of another user due to privacy concern. Thus, the communication device 40 does not monitor the D2D resources for the D2D communication when the D2D communication is disabled. In this way, battery power is saved for the communication device 40.

On the other hand, an operator may want to control the D2D communication for the communication device 40. The network of the operator may transmit a message including information indicating the D2D communication is enabled (supported) or disabled (or not supported). The message may be a dedicated message or a broadcast message and may be a Radio Resource Control (RRC) message, a Non-Access Stratum (NAS) message, Open Mobile Alliance (OMA) Device Management (DM) message or a Bearer Independent Protocol (BIP) message. With the dedicated message, the network can enable or disable the D2D communication for a specific communication device. With the broadcast message, the network can enable or disable the D2D communication for a plurality of communication devices at a time. With such operations, the communication device 40 enables or disables the D2D communication device in response to the message.

It is noted that the D2D communication can be used for transmission of message, image, audio, voice, and video. Those skilled in the art will readily observe that combination of steps in different processes, numerous modifications and alterations of the device and method may be made wile retaining the teachings of the invention.

Although the present invention has been described in considerable detail with reference to certain embodiments thereof, other embodiments are possible. Therefore, the scope of the appended claims should not be limited to the description of the embodiments contained herein.

What is claimed is:

1. A communication device comprises:
a communication interfacing unit;
a display unit; and
a processor electrically connected with the communication interfacing unit and the display unit, the processor operable to perform operations comprising:
controlling the display unit to display a user interface;
controlling the display unit to display a first icon on the user interface, wherein the first icon indicates a first strength of a first signal of a radio access technology (RAT) received by the communication interfacing unit; and
controlling the display unit to display a second icon on the user interface corresponding to a second strength of a second signal of the same RAT received by the communication interfacing unit, wherein the first signal and the second signal are transmitted by different devices;
under a condition that the second signal of the RAT is not received for a predetermined time threshold, controlling the display unit to display a third icon indicating there is no service of a communication relevant to the second signal.

2. The communication device as claimed in claim 1, wherein the first signal is transmitted by an evolved node B (eNB), and the second signal is a device to device (D2D) signal transmitted by a user equipment (UE).

3. The communication device as claimed in claim 1, wherein the first signal is a cell-specific reference signal (CRS) or a channel state information reference signal (CSI-RS).

4. The communication device as claimed in claim 1, wherein the first signal is a D2D synchronization signal (D2DSS) or a physical D2D synchronization channel (PD2DSCH).

5. The communication device as claimed in claim 1, wherein both of the first icon and the second icon are displayed on a status bar of the user interface.

6. A communication device comprises:
a communication interfacing unit;
a display unit; and
a processor electrically connected with the communication interfacing unit and the display unit, the processor operable to perform operations comprising:
controlling the display unit to display a user interface;
controlling the display unit to display a first icon on the user interface, wherein the first icon indicates a packet data network (PDN) connection with a network is activated in a radio access technology (RAT); and
controlling the display unit to display a second icon on the user interface corresponding to whether a first D2D communication is activated to allow the communication device to receive and/or transmit a first D2D signal with a first communication device via the communication interfacing unit in the RAT;
wherein the operation of controlling the display unit to display the second icon on the user interface comprises:
controlling the display unit to display the second icon on the user interface corresponding to activations of the first D2D communication and a second D2D communication.

7. The communication device as claimed in claim 6, wherein the PDN connection is activated to allow the communication device to transmit data to the network via an eNB.

8. The communication device as claimed in claim 6, wherein the operations further comprising:
under a condition that the first D2D signal is not received for a predetermined time threshold, controlling the display unit to display a third icon on the user interface indicating there is no service relevant to the first D2D communication.

9. The communication device as claimed in claim 6, wherein the operations further comprising:
controlling the display unit to display a third icon on the user interface corresponding to whether a second D2D communication is activated to allow the communication device to receive and transmit a second D2D signal with a second communication device via the communication interfacing unit.

10. The communication device as claimed in claim 6, wherein both of the first icon and the second icon are displayed on a status bar of the user interface.

11. A communication device comprises:
a communication interfacing unit;
a display unit; and
a processor electrically connected with the communication interfacing unit and the display unit, the processor operable to perform operations comprising:
controlling the display unit to display a user interface, wherein a plurality of items corresponding to contacts are presented on the user interface;
in response to an activation corresponding to a selected item of the items, activating a D2D communication with a device of a selected contact of the contacts corresponding to the selected item or controlling the display unit to display an option to activate a first D2D communication with the device of the selected contact; and
controlling the display unit to display an icon visually corresponding to one of the items, wherein the icon indicates that a second D2D communication with a device of one of the contacts corresponding to the one of the items is activated or the icon indicates a signal strength of a signal relevant to the second D2D communication with the device of the one of the contacts corresponding to the one of the items is activated;
wherein the first D2D communication with the device of the selected contact is activated to allow the communication device to receive and/or transmit a first D2D signal with the device of the selected contact.

12. The communication device as claimed in claim 11, wherein the operations further comprising:
in response to the activation corresponding to the selected item, controlling the display unit to display an option to initiate a D2D discovery operation to check whether the device of the selected contact is reachable;
wherein under a condition that the device of the selected contact is reachable, the first D2D signal transmitted by the communication device is able to be received by the device of the selected contact.

13. The communication device as claimed in claim 11, wherein the operations further comprising:
in response to the activation corresponding to the selected item, controlling the display unit to display an option to transmit a D2D message to the device of the selected contact.

14. The communication device as claimed in claim 11, wherein the operations further comprising:
controlling the display unit to display a plurality of group items respectively corresponding to a plurality of groups of the contacts on the user interface; and
in response to an activation corresponding to a selected group item of the group items, activating D2D communications with devices of the contacts belongs to a selected group of the groups corresponding to the selected group item or controlling the display unit to display an option to activate second D2D communications with the devices of the contacts belongs to the selected group;
wherein the second D2D communications with the devices of the contacts belongs to the selected group are activated to allow the communication device to receive and transmit second D2D signals with the devices of the contacts belongs to the selected group.

15. The communication device as claimed in claim 14, wherein the operations further comprising:
in response to the activation corresponding to the selected group item, controlling the display unit to display an option to transmit a D2D message to the devices of the contacts belongs to the selected group.

16. A communication device comprises:
a communication interfacing unit;
a display unit; and
a processor electrically connected with the communication interfacing unit and the display unit, the processor operable to perform operations comprising:
controlling the display unit to display a user interface;
controlling the display unit to display a first icon on the user interface, wherein the first icon indicates a first strength of a first signal of a radio access technology (RAT) received by the communication interfacing unit; and
controlling the display unit to display a second icon on the user interface corresponding to a second strength of a second signal of the same RAT received by the communication interfacing unit, wherein the first signal and the second signal are transmitted by different devices;
wherein the operation of controlling the display unit to display the second icon on the user interface comprises:
controlling the display unit to display the second icon on the user interface corresponding to the second strength of the second signal and a third strength of a third signal of the RAT received by the communication interfacing unit, and all of the first signal, the second signal, and a third signal are transmitted by different devices.

* * * * *